(12) United States Patent
Bedingfield, Sr.

(10) Patent No.: US 7,894,589 B2
(45) Date of Patent: *Feb. 22, 2011

(54) METHOD AND SYSTEM FOR IDENTIFYING TELEMARKETER COMMUNICATIONS

(75) Inventor: James C. Bedingfield, Sr., Lilburn, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/622,544

(22) Filed: Nov. 20, 2009

(65) Prior Publication Data

US 2010/0067678 A1     Mar. 18, 2010

Related U.S. Application Data

(63) Continuation of application No. 11/765,253, filed on Jun. 19, 2007, now Pat. No. 7,623,646, and a continuation of application No. 10/659,146, filed on Sep. 10, 2003, now Pat. No. 7,233,656.

(51) Int. Cl.
    *H04M 3/436*    (2006.01)
(52) U.S. Cl. ............. 379/210.02; 379/196; 379/207.15; 379/210.03
(58) Field of Classification Search ............... 379/88.19, 379/88.2, 88.21, 120, 127.01, 142.01, 207.15, 379/210.02, 210.03, 188, 196–200
    See application file for complete search history.

(56) References Cited

U.S. PATENT DOCUMENTS 5,361,295 A    11/1994    Solomon et al.
6,385,310 B1    5/2002    Holiday, II
6,542,596 B1    4/2003    Hill et al.
6,553,109 B1    4/2003    Hussain et al.
6,990,187 B2    1/2006    MacNamara et al.
7,020,259 B2    3/2006    Hussain et al.
7,233,656 B2    6/2007    Bedingfield, Sr.
7,623,646 B2 *    11/2009    Bedingfield, Sr. ...... 379/210.02

\* cited by examiner

*Primary Examiner*—Harry S Hong
(74) *Attorney, Agent, or Firm*—Cantor Colburn LLP

(57) ABSTRACT

A method and system for identifying telemarketer communications directed to a subscriber of a call screening service is provided. A link monitoring system monitors all inbound and outbound calls of a carrier network collecting data such as calling and called telephone directory numbers, and a termination status for at least each inbound call to a calling number. The data is analyzed at a telemarketer detection module to determine calling patterns of calling numbers. If a calling pattern of a calling telephone number matches a profile of telemarketer communications, the calling number is stored in a database of telephone directory numbers associated with telemarketer communications. A call is received from a calling party directed to a subscriber of the call screening service. Then a determination is made as to whether a telephone directory number of the calling party is known. If the telephone number of the calling party is known, a determination is made as to whether the telephone number of the calling party matches a telephone number stored in the database of telephone numbers associated with telemarketer communications. If a match exists, the call is intercepted from reaching the subscriber of the call screening service.

6 Claims, 5 Drawing Sheets

METHOD AND SYSTEM FOR IDENTIFYING TELEMARKETER COMMUNICATIONS

CROSS-REFERENCE TO RELATED APPLICATIONS

This application is a continuation of U.S. patent application Ser. No. 11/765,253 filed Jun. 19, 2007, the contents of which are incorporated herein by reference in their entirety which is a continuation of U.S. patent application Ser. No. 10/659,146 filed Sep. 10, 2003, now U.S. Pat. No. 7,233,656, the entire contents of which are incorporated herein by reference.

FIELD OF THE INVENTION

The present invention generally relates to call processing in a telephone network providing a call screening service to subscribers and, more particularly, relates to methods and systems for identifying telemarketer communications.

BACKGROUND OF THE INVENTION

Since the advent of modern telephony users of telephones have been burdened by unwanted and unsolicited telephone calls. In recent times telephone based commercial solicitations have exasperated this problem because telephone solicitors, also known as telemarketers, place calls to unsuspecting users at all hours of the day.

Systems have been developed for blocking or intercepting calls from telephone solicitors where the solicitor does not provide a telephone directory number or where the solicitor blocks caller identification for solicitor communication attempts. For example the caller identification for such telephone solicitors is often rendered as 'Private', 'Out of Area', 'Unavailable' or 'Blocked' etc. However such systems are ineffective at intercepting calls from undesired calling parties when the calling party does allow caller identification because the undesired call is allowed to come through to the called party. The called party then has no means of notifying the calling party not to call again unless the called party answers the phone and hears an initial marketing pitch. If a machine is utilized to make the call, the called party may experience another ringing telephone interruption only to answer to silence on the calling end with no opportunity to tell the caller not to call again. Although caller identification technology reveals who the caller is and undesired calls may be ignored, the caller is likely to call again unless told not to call again. Thus, the interruption of a ringing telephone from the same undesired telemarketers is not permanently resolved.

Accordingly there is an unaddressed need in the industry to address the aforementioned deficiencies and inadequacies.

SUMMARY OF THE INVENTION

Embodiments of the present invention provide methods and systems for identifying solicitor or telemarketer communications. A monitoring system monitors incoming and outgoing telephone calls to and from a network. An analysis is performed on data accumulated by the monitoring system to determine whether certain calling parties are calling from telephone directory numbers that match a predetermined profile of a telemarketer. For instance, a telephone directory number that has a large number of outgoing calls with little to no incoming calls terminated or answered could possibly match the profile of a telemarketer telephone directory number. If a telephone number matches the telemarketer profile it is stored in a database of telephone numbers associated with telemarketer or solicitor communication.

As calls come in directed to a subscriber of a privacy or call screening service a determination is made as to whether the telephone directory number of the calling party is known. If the telephone number is known, the number is then compared to the telephone numbers in the database of telephone numbers associated with telemarketer communication. If the calling number matches a telephone number stored in the database, then the call is intercepted from reaching the subscriber and processed accordingly.

Furthermore, as the database of telephone numbers associated with telemarketer communication continues to store the calling numbers that match the profile of a telemarketer, verifications that the telephone numbers continue to meet the profile are made. For instance, a calling number that is stored in the database but later becomes disconnected may be verified and removed from the database. Secondly, telephone numbers that once matched the profile but since then have started receiving and terminating more calls than a profile threshold may be removed from the database. Also, calling telephone numbers initially matching the profile criteria but not having a telemarketing purpose may be discovered and removed from the database.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

DETAILED DESCRIPTION

As described briefly above, embodiments of the present invention are directed to methods and systems for identifying telemarketing communications. In the following detailed description, references are made to the accompanying drawings that form a part hereof, and in which are shown by way of illustrations, specific embodiments or examples. These embodiments may be combined, other embodiments may be utilized, and structural changes may be made without departing from the spirit or scope of the present invention. The following detailed description is, therefore, not to be taken in a limiting sense and a scope of the present invention is defined by the appended claims and their equivalents.

Figure 1:
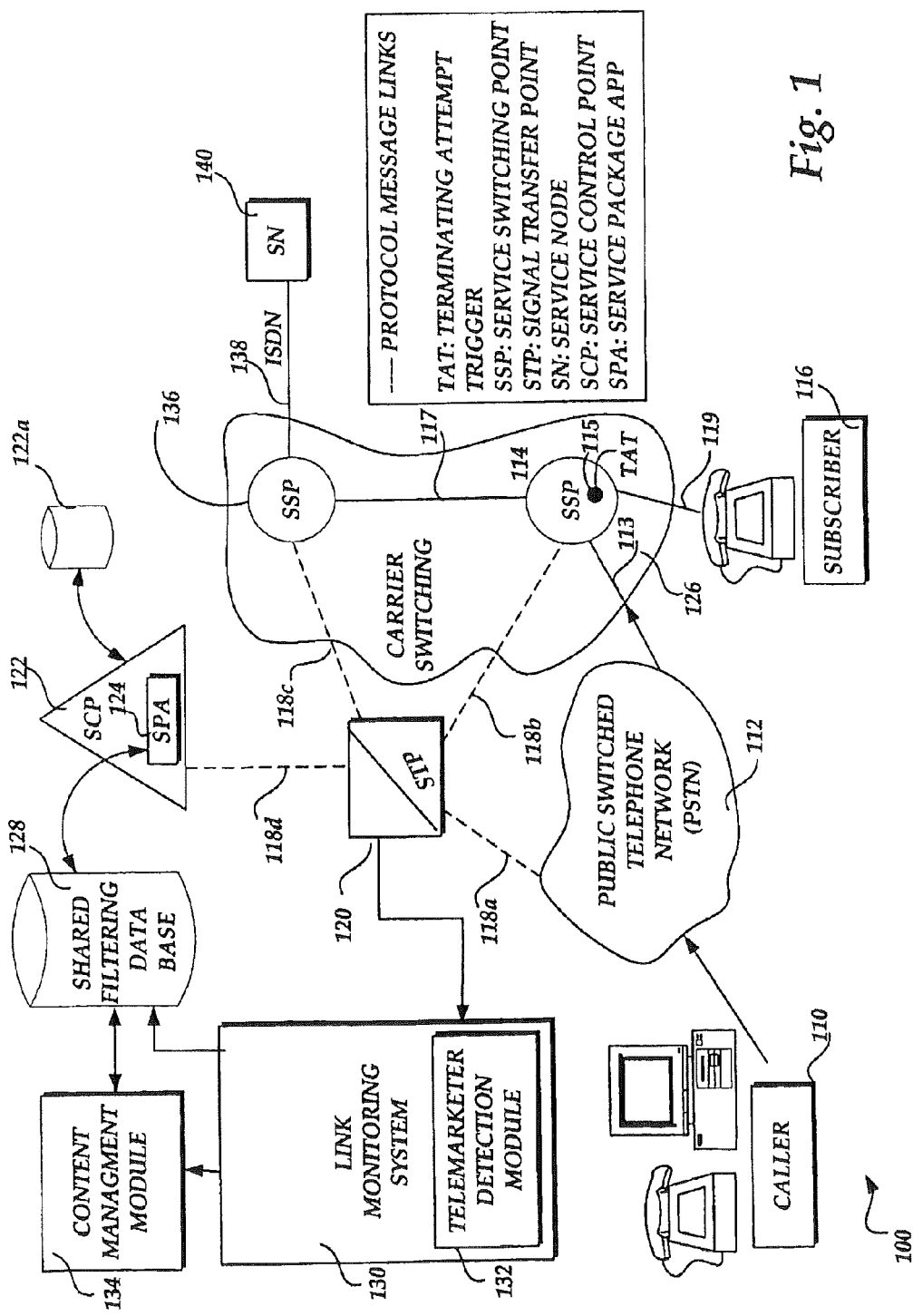
FIG. 1 is a schematic diagram illustrating components of a public switched telephone network, an advanced intelligent telecommunications network (AIN), and telemarketer detection components that provide an operating environment for the present invention.

It is advantageous to describe an exemplary operating environment in which the present invention may operate. FIG. 1 is a schematic diagram illustrating components of a public switched telephone network, an advanced intelligent telecommunications network (AIN), and telemarketer detection components that provide an operating environment for the present invention and include a general description of a modern public switched telephone network through which the present invention operates. The modern public switched telephone network (PSTN) has separate signaling paths for voice signals (or other customer-utilized communication circuits) and for control signals, which include information transmitted throughout the network to control the connection and disconnection of the voice circuits. Voice signals are typically carried through trunk connections, while control signals are carried across the signaling system 7 (SS7) network.

The PSTN also incorporates the AIN. Some of the AIN components are illustrated in FIG. 1. The AIN also uses the SS7 network for signal or system control message transport. The components thereof are well known in the art. However, it should be appreciated that other protocols, such as the Session Initiation Protocol (SIP), a TCP/IP-based protocol may be used for signal or system control message transport.

Referring still to FIG. 1, a plurality of central offices is provided in typical public switched telephone network. Each central office may include an electronic switch known to those skilled in the art as a service switching point (SSP). These are indicated in FIG. 1 as SSP switches 114 and 136. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 113 and 117. The switching components within a local exchange network are denoted by the carrier switching 126.

SSP 114 has a subscriber line 119 connected thereto. Each subscriber line is connected to a terminating piece or pieces of customer premises equipment that are represented by the telephone 116. SSP switches 114 and 136 are connected by a plurality of trunk circuits indicated as 113 and 117 in FIG. 1. These are the voice path trunks that interconnect the switches and over which calls are completed.

Each piece of terminating equipment in the PSTN is assigned a directory number. The terms "telephone directory number", "telephone number", and "directory number" are used herein in a manner consistent with its generally understood meaning of a number that is dialed or input by an originating or calling party at an originating station to reach a terminating station associated with the directory number. A directory number, typically a ten digit number, is commonly referred to as a "telephone number" and may be assigned to a specific telephone line, such as the telephone line 116 shown in FIG. 1.

Much of the intelligence, and the basis for many of the enhanced features of the network, resides in the local service control point (SCP) 122 that has a database 122a containing subscriber information, and is connected to the gateway signal transfer point 120a via the SS7 data link 118d. As is known to those skilled in the art, service control points such as SCP 122, are physically implemented by relatively powerful fault tolerant computers. Among the functions performed by the service control points is maintenance of the network databases used in providing enhanced services and the execution of service package applications (SPA). The SCP 122 executes the call screening or privacy screening SPA 124 in response to a query initiated from the terminating attempt trigger 115 of the subscriber SSP 114.

The SCP 122 is also connected to the shared database 128, where telephone numbers associated with telemarketers or solicitors are stored. The telemarketer database 128 may be used to provide a look-up database for use in conjunction with the call screening service. As will be described in greater detail below, when executed, the call screening SPA 124 queries the database 128 for a match between a calling number and a number stored in the database 128. The database of telephone directory numbers associated with telemarketer communications 128 is shared among all subscribers of the privacy screening service and the service control points executing the service package application for the privacy screening service. While FIG. 1 shows the database 128 separated from the SCP 122, it should be appreciated that the database 128 may also be implemented as a component of the SCP 122.

In operation, the intelligent network elements of the AIN 100, as described above, communicate with each other via digital data messages transmitted over the network of digital data links 118. An SSP may be configured to interface with these network elements through the use of a terminating attempt trigger 115 (TAT). When the caller 110 places a call to the subscriber 116, because the subscriber has subscribed to the privacy screening service, the call (like all calls to that subscriber's number) triggers the TAT 115. A trigger in the network is an event associated with a particular subscriber line or call that causes the SSP 114 to generate a data packet message to be sent to a SCP. It should be appreciated that the call reaching the TAT 115 may originate from the telephone of a calling party, from a computer, from the Internet, or from other communications signal sending equipment.

The message created by the SSP 114 in response to the TAT 115 is known as a "query" message. A query message opens a "transaction" and the SSP generally holds the communication until it receives a reply from an appropriate network element via the network of digital links instructing the SSP 114 to take action. If the SSP 114 receives no instructions with a certain amount of time, the SSP "times out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP 114 to route the held communication for connection with a terminating station. Query messages, conversation messages, and response messages are standard types of messages defined by the AIN protocol. The details of the AIN protocol are known to those skilled in the art and will not be further described herein.

The modern AIN 100 also includes service nodes (SN) such as service node 140 shown in FIG. 1. Those skilled in the art are familiar with service nodes, which are physically implemented by the same types of computers that embody the SCP 122. In addition to the computing capability and database maintenance features, service nodes 140 use integrated services digital network ISDN lines 138 and may include Dual Tone Multi-Frequency (DTMF) signal recognition circuits, text to speech (TTS) voice synthesizers, voice recognition and digit collection capabilities, and other voice or data resources. As shown in FIG. 1, the connection is through an SSP. For example SN 140 is connected to the SCP 122 via the ISDN links 138 to the SSP 136, the ISDN/SS7 protocol conversion in SSP 136, and the SS7 links 118c and 118d. SNs are used principally when some custom feature or service is needed that requires an audio connection to the call or to transfer of a significant amount of data to a subscriber over a switched connection during or following a call.

The link monitoring system (LMS) 130 interfaces with the AIN 100 via the signal transfer point (STP) 120. In certain networks, gateway STPs are used. Gateway STPs are components by which calls from outside the carrier network enter the carrier network and through which queries reach an SCP. The LMS 130 monitors all inbound and outbound calls to, from, and within the carrier network collecting data from protocol messages. The link monitoring system 130 also provides the telemarketer detection software module 132. The telemarketer detection module 132 analyzes the collected data for call patterns and determines whether the call pattern of any calling telephone directory numbers match a telemarketer profile. The calling numbers that match the telemarketer profile are stored within or used to populate the telemarketer database 128. As an alternative or in conjunction with the telemarketer detection module 132, the database 128 may be populated by calling party telephone directory numbers identified by the called parties as a telemarketer number, self-identified by one or more telemarketers, or received from a regulatory database of telemarketers required to identify their respective telephone directory numbers under government regulations.

A content management module 134 is also provided to manage the content of the telemarketer database 128 such that the calling numbers stored are periodically verified or evaluated for continuously matching the telemarketer profile. For example, calling numbers that the LMS 130 no longer records at a threshold frequency, calling numbers that match the telemarketer profile but do not have a telemarketing purpose, and calling numbers that have been disconnected or stored for more than X days, months, or years may be removed from the database 128 by the content management module 134. Additional details regarding the LMS 130 will be described below with regard to FIGS. 2, 3, and 5.

Figure 2:
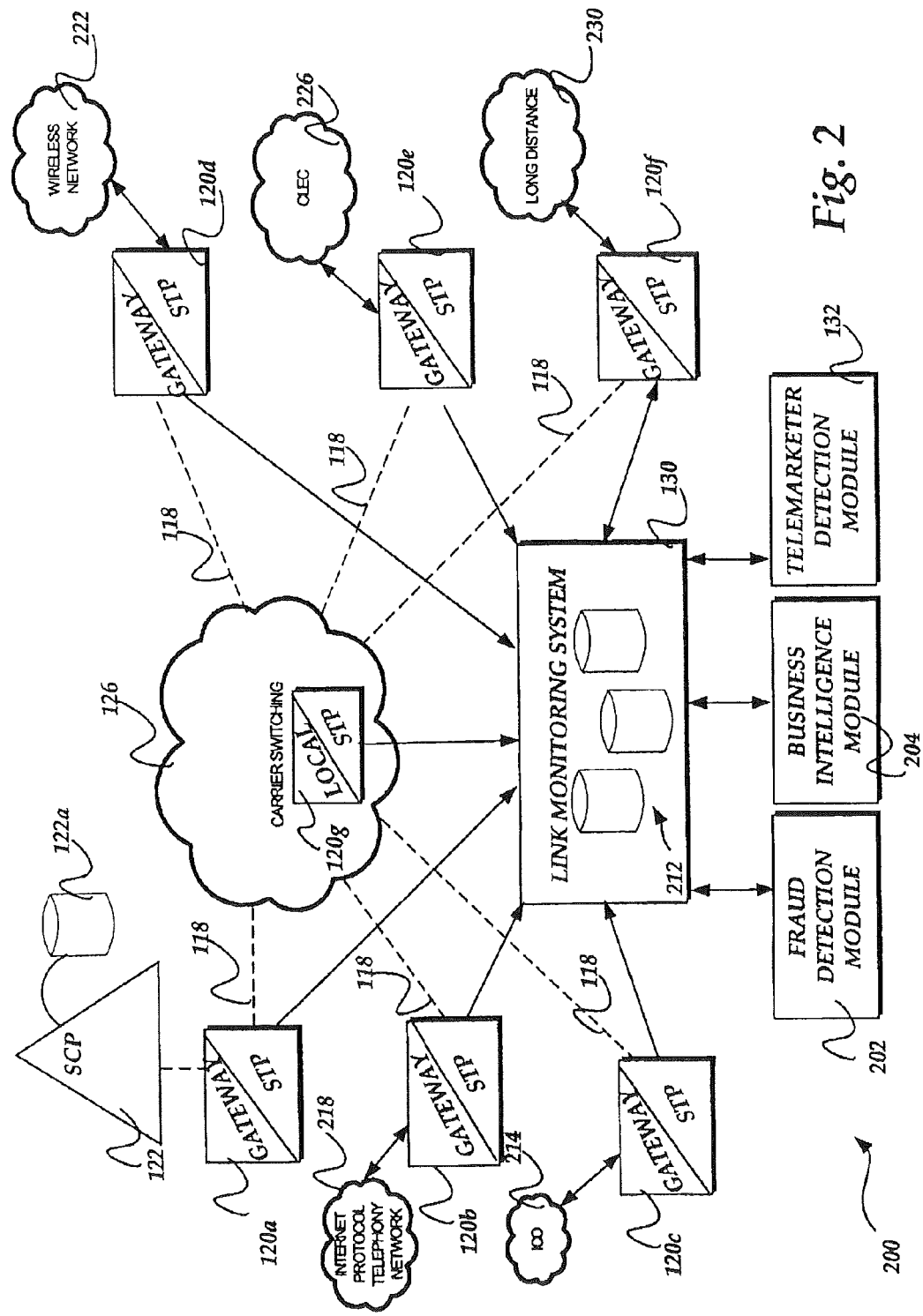
FIG. 2 is a schematic diagram illustrating a link monitoring system provided in an embodiment of the present invention.

FIG. 2 is a schematic diagram illustrating a link monitoring system provided in an embodiment of the present invention. As described briefly above, the LMS 130 monitors calls originating from or attempting to terminate in the local exchange carrier network. The LMS 130 monitors calls via the STPs 120a-120g that route packets of data to and from the carrier switching 126 via the data links 118. Calls may enter the carrier network and the carrier switching 126 via the gateway STPs 120a-120f from multiple outside networks such as the wireless network 222, the competitive local exchange carrier (CLEC) 226, the long distance carrier 230, the independent central office (ICO) 214, and an Internet protocol-based telephony network 218. Calls originating and attempting termination within the carrier switching 126 may also be monitored by the LMS 130 via the local STPs such as the STP 120g. Data collected by the LMS 130 includes the calling and called telephone directory numbers of each monitored call, the termination status of each monitored call, and a time of each monitored call.

The LMS 130 is equipped with software packages that analyze the data collected and stored in the disc drives 212. The LMS may offer a fraud detection module 202 for detecting fraudulent activity on the network, a business intelligent module 204 for calculating local exchange carrier statistics for use in business decisions, and the telemarketer detection module 132 for analyzing the collected data for calling numbers matching a telemarketer profile. Additional details regarding the telemarketer detection module 132 will be described below with respect to FIG. 5.

Figure 3:
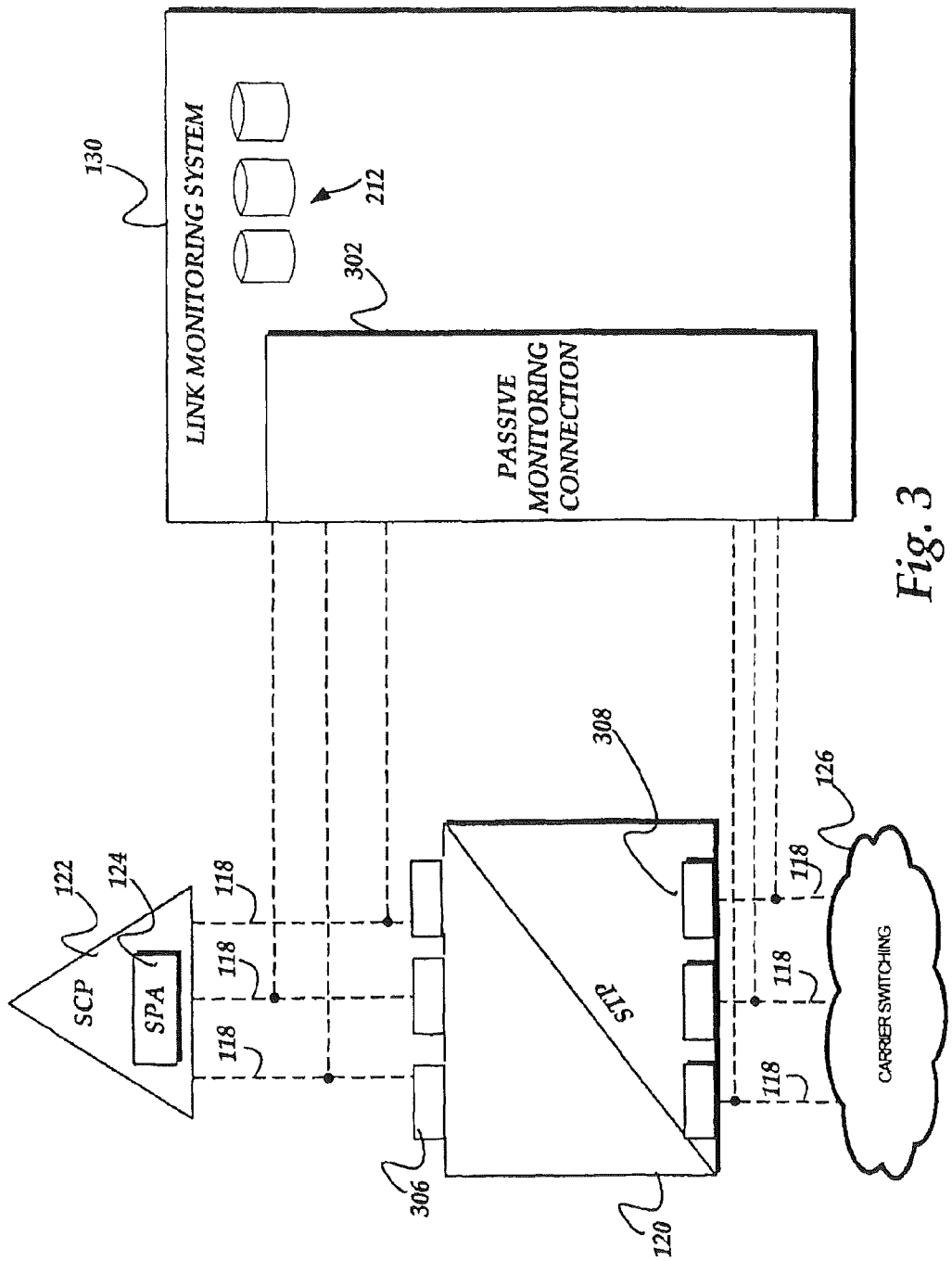
FIG. 3 is a schematic diagram illustrating the connectivity of a passive monitoring connection provided by the link monitoring system of FIGS. 1-2.

FIG. 3 is a schematic diagram illustrating the connectivity of a passive monitoring connection 302 within the link monitoring system of FIGS. 1-2. Each STP 120 has external ports 306 and internal ports 308. The LMS 130 is equipped with the passive monitoring connection 302 for monitoring the data links 118 emerging from and entering the external ports 306 and the internal ports 308 of the STPs 120. The passive monitoring connection 302 enables the LMS 130 to monitor all the SS7 protocol messages for every call transaction to, from, or within the carrier switching 126.

Figure 4:
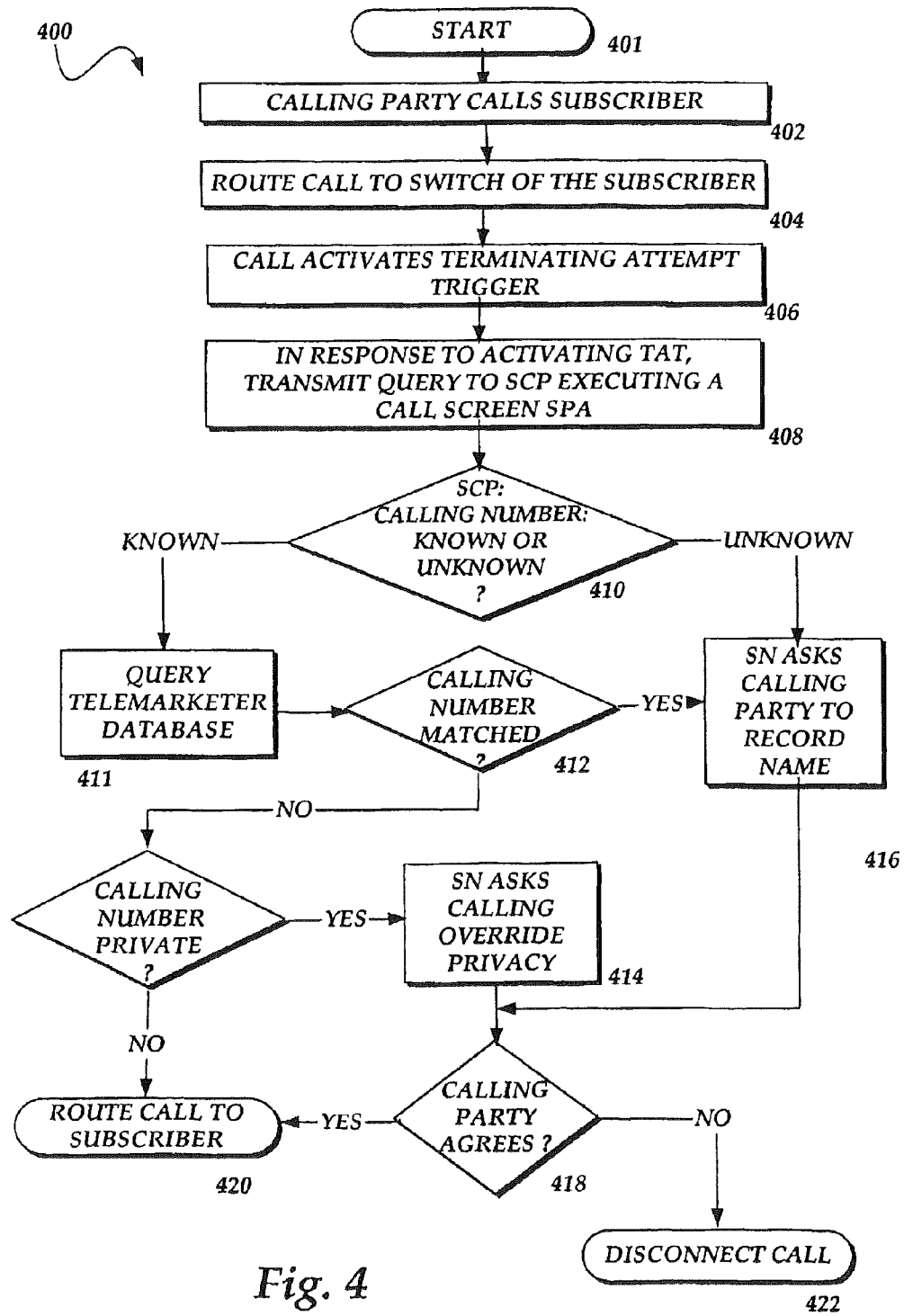
FIG. 4 illustrates an operational flow for identifying telemarketing communications according to an embodiment of the invention.

Referring now to FIGS. 1 and 4 an operational flow for identifying telemarketing communications according to an embodiment of the invention will be described. The routine 400 begins with start operation 401. Next the routine 400 continues to operation 402 where a calling party 110 calls a subscriber 116 via the PSTN 112. The routine 400 then continues to operation 404 where the call is routed to the switch 114 of the subscriber. The routine 400 then continues to operation 406 where the call activates the TAT 115 and in response to the TAT 115 being activated, the routine 400 continues to operation 408.

At operation 408, a query is transmitted to the SCP 122 via the STP 120 over the data links 118. The query includes the calling party's telephone number, the subscriber's number and a presentation indicator of the calling party. The routine 400 then continues to operation 410 where the SCP 122 executes the call screening SPA 124 to determine what to do with the call. The SPA 124 examines the telephone number of the calling party to determine whether the calling number is known or unknown. If the calling party number is known, the routine 400 continues from operation 410 to operation 411 where the telemarketer database 128 is queried to determine whether the calling party number matches any of the numbers associated with telemarketer or solicitor communications stored in the database 128.

The routine 400 then continues from operation 411 to operation 412 where a determination is made as to whether a match was found between the calling number and a number stored in the database 128. If a match is not found, the routine 400 continues to operation 413 where a determination is made as to whether the calling number is private. If the calling number is not private, the routine 400 continues to operation 420 where the call is authorized and routed to the subscriber 116 where the subscriber may be notified of the call and the name of the calling party. Upon being notified of the caller's name, the subscriber may be given options to handle the call such as answering, ignoring the call and sending a message of unavailability, or sending a no call message.

If a match is found, the routine 400 continues from operation 412 to operation 414 where the call is intercepted and transferred to the SN 140 via the switch 136. At operation 414, the SN 140 may ask the calling party to record his/her name and purpose for the call. The operation 400 then continues from operation 414 to operation 418 where a determination is made as to whether the calling party agreed and recorded her/his name and purpose. If the calling party did not agree, the call is disconnected or terminated at operation 422 thereby not ringing the subscriber's 116 telephone. If the calling party agrees and records his/her name and purpose, the routine 400 continues from operation 418 to 420 described above.

If at operation 413 it is determined that the calling party number is private, the routine 400 continues to operation 416. At operation 416 the SN 140 may ask the calling party to unblock the private status of the call. The routine 400 then continues from operation 416 to operation 418 described above.

If at operation 410 it is determined that the calling party number is unknown, the routine 400 continues from operation 410 to operation 414 then operation 418 described above.

It should be appreciated that although the present embodiment describes using the identification of a calling number to route the call through a privacy screening service, other uses of the calling number may be made. For instance, the calling number identification may be used to completely block the call or automatically send the call to the voice mail system of a subscriber.

Figure 5:
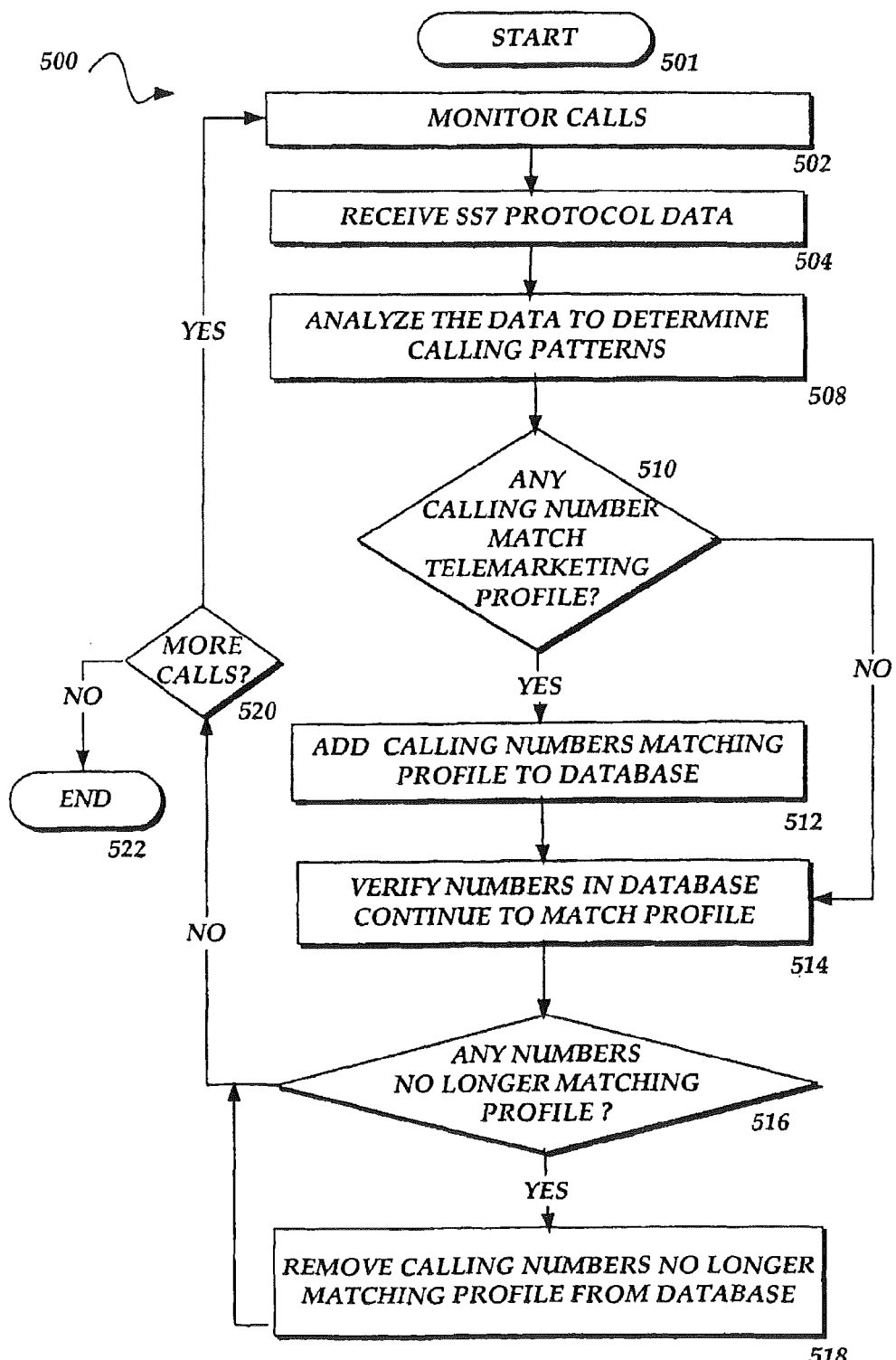
FIG. 5 illustrates an operational flow for populating and maintaining a database of telephone numbers associated with telemarketing communications according to an embodiment of the invention.

Turning now to FIGS. 1 and 5 an operational flow for populating and maintaining a database of telephone numbers associated with telemarketing communications according to an embodiment of the invention will be described. The routine 500 begins at start operation 501. Next the routine continues to operation 502 where the LMS 130 monitors all inbound and outbound calls of the carrier network. The routine 500 then continues to operation 504 where SS7 protocol data including a calling and a called telephone directory number, and a termination status for each monitored call is received and collected via the passive monitoring connection 302 into the disc drives 212. The termination status refers to an indicator as to whether a monitored call is terminated or answered.

Next the routine 500 continues to operation 508 where the calling and called telephone directory numbers and the termination status of each monitored call are analyzed to determine calling patterns. It should be appreciated that in the alternative, the termination status of at least each inbound call to the calling telephone directory numbers may be analyzed to determine calling patterns.

The routine 500 then continues to operation 510 where the telemarketer detection module determines whether any calling patterns of the collected calling numbers match a profile of telemarketer communications. The telemarketer profile may outline parameters for the calling numbers such as: greater than or equal to a predetermined minimum quantity of outbound calls from the calling number over a data collection cycle because telemarketers likely make a significant amount of outbound calls, less than or equal to a predetermined maximum quantity of inbound calls that terminate at the calling number over the same data collection cycle because very few inbound calls to a telemarketer, if made, are answered, and the majority of the calls originating between specified times which are likely to be a prime or typical time for telemarketers initiate calls to and reach potential customers with respect to the time zone. If no matches occur at operation 510, the routine 500 continues from operation 510 to operation 514 described below.

If any calling patterns of one or more calling telephone numbers match the profile of telemarketer communications, the routine 500 continues from operation 510 to operation 512 where one or more calling telephone directory numbers matching the profile associated with telemarketer communications are added to the database 128. The routine 500 then continues to operation 514 where the calling numbers stored in the database 128 are verified by the content management module 134 for continued matching with the telemarketer profile. For example, if a calling number is disconnected or is no longer recorded as exceeding a predetermined minimum for originating calls during a specified time, the calling number may be removed from the database 128. Furthermore, if administrators of the database are made aware that a calling number matching the profile really does not have a telemarketing purpose or has a non-telemarketing purpose, the administrators may also remove that number from the database 128.

The routine 500 then continues from operation 514 to operation 516 where a determination is made whether any numbers currently stored in the database no longer match the telemarketer profile. If there are calling numbers that no longer match the telemarketer profile, the routine 500 continues to operation 518 where the calling numbers no longer matching the telemarketer profile are removed from the database 128. The routine 500 then continues to operation 520 described below.

If at operation 516 all the calling numbers in the database 128 continue to match the telemarketer profile, the routine 500 continues to operation 520 where a determination is made as to whether more calls are available to monitor. If no calls are being sent into, out of, or within the carrier network, the routine terminates at end operation 522. If more calls are available for monitoring the routine 500 returns to operation 502 described above.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method for identifying telemarketer communications directed to a subscriber of a call screening service comprising:
  receiving a call from a calling party directed to a subscriber of the call screening service;
  determining whether a telephone directory number of the calling party is known, the determining performed by a service package application accessing a database;
  if the telephone directory number of the calling party is known, determining whether the telephone directory number of the calling party matches one or more telephone directory numbers stored in a database of telephone directory numbers associated with telemarketer communications; and
  if the telephone directory number of the calling party matches one or more of the telephone directory numbers stored in the database of telephone directory numbers associated with telemarketer communications, intercepting the call from reaching the subscriber of the call screening service;
  wherein when the telephone directory number of the calling party is unknown, intercepting the call from reaching the subscriber of the call screening service and requesting that the calling party record a purpose for the call prior to routing the call to the subscriber.

2. The method of claim 1, wherein when the telephone directory number of the calling party does not match at least one of the telephone directory numbers stored in the database of telephone directory numbers associated with telemarketer communications, determining whether the telephone directory number of the calling party is private.

3. The method of claim 2, wherein when the telephone directory number of the calling party is not private, authorizing the call and routing the call to the subscriber.

4. The method of claim 3, wherein routing the call to the subscriber comprises:
  notifying the subscriber of the calling party's name; and
  providing at least one option to the subscriber to handle the call, the at least one option comprising at least one of answering the call, ignoring the call, sending a message of unavailability, and sending a no call message.

5. The method of claim 2, wherein when the telephone directory number of the calling party is private, requesting the calling party to unblock a private status of the call.

6. The method of claim 1, prior to determining whether the telephone directory number of the calling party matches at least one of the telephone directory numbers stored in the database of telephone directory numbers associated with telemarketer communications further comprising:

monitoring inbound calls and outbound calls associated with a carrier network;

collecting a calling telephone directory number, a called telephone directory number, and a termination status for each of the inbound calls and the outbound calls monitored wherein the termination status comprises an indicator as to whether a call is answered;

analyzing the termination status of at least each inbound call to the calling telephone directory numbers to determine a calling pattern for each of the calling telephone directory numbers;

determining whether the calling pattern for any of the calling telephone directory numbers match a profile of telemarketer communications; and when the calling pattern for any of the calling telephone directory numbers match the profile of telemarketer communications, storing those calling telephone directory numbers having a calling pattern that matches the profile in the database of telephone directory numbers associated with telemarketer communications.

* * * * *